Jan. 3, 1939. D. L. WALLACE 2,142,388
COUPLING FOR SECTIONS OF PREFABRICATED BUILDINGS
Filed June 3, 1937 2 Sheets-Sheet 1
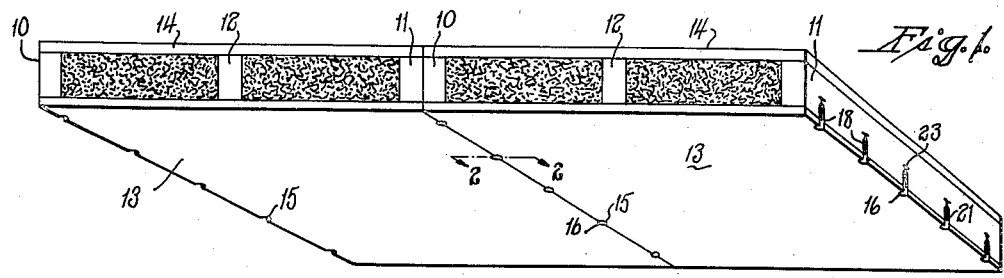
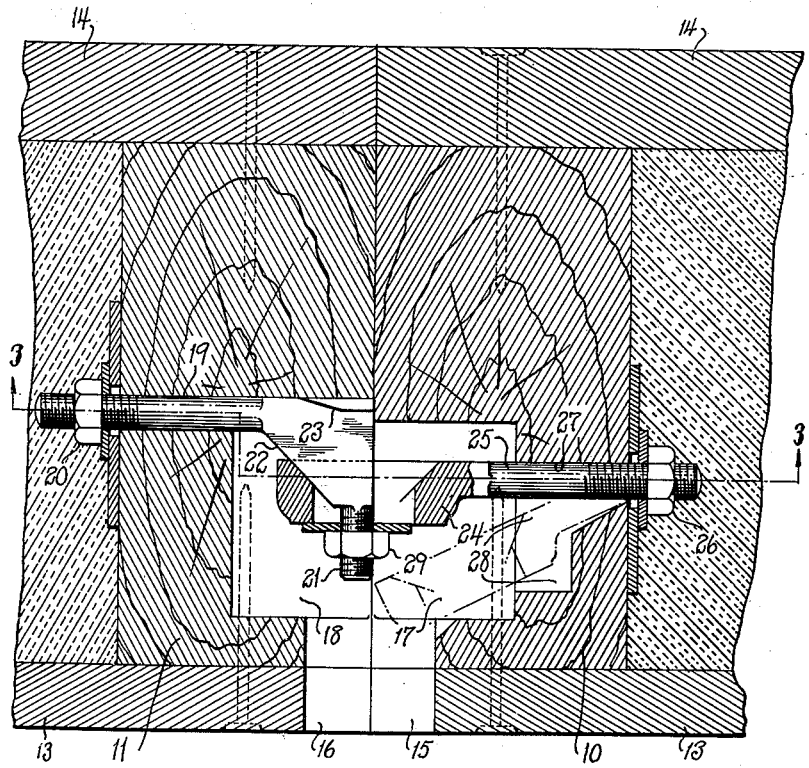
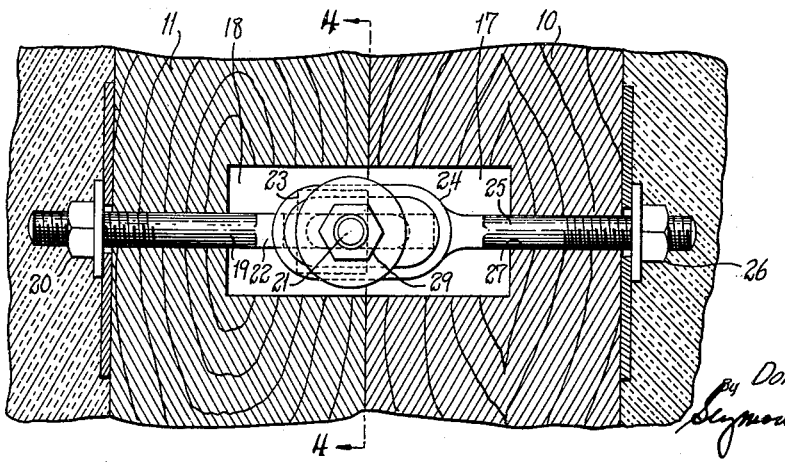
Inventor
Donald L. Wallace
Attorneys Jan. 3, 1939.  D. L. WALLACE  2,142,388
COUPLING FOR SECTIONS OF PREFABRICATED BUILDINGS
Filed June 3, 1937  2 Sheets-Sheet 2
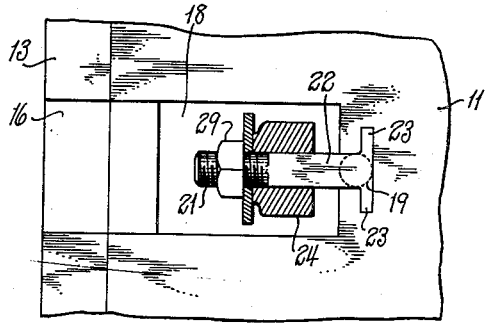
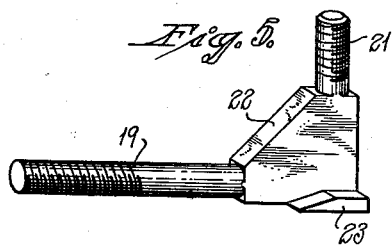
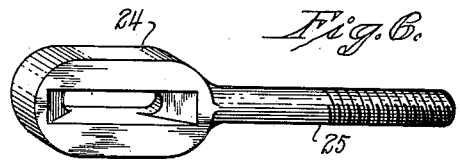
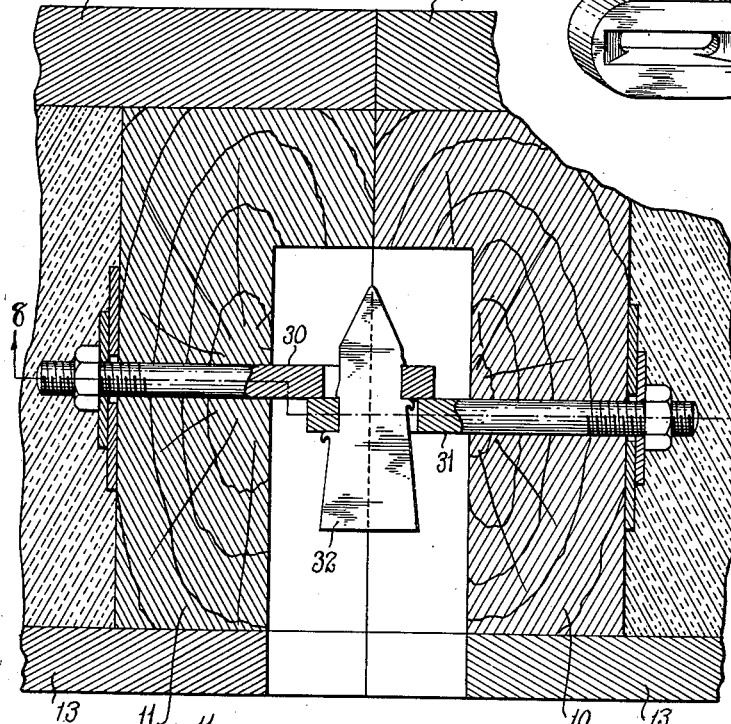
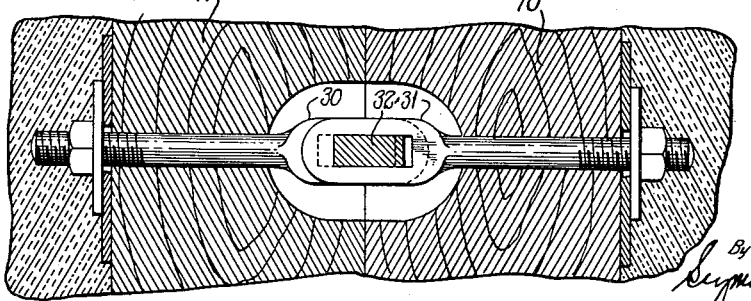
Inventor
Donald L. Wallace
By Seymour Earle & Nichols
Attorneys Patented Jan. 3, 1939

2,142,388

UNITED STATES PATENT OFFICE 2,142,388

COUPLING FOR SECTIONS OF PREFABRICATED BUILDINGS

Donald L. Wallace, Cheshire, Conn.

Application June 3, 1937, Serial No. 146,157

3 Claims. (Cl. 20—92)

This invention relates to an improvement in couplings for prefabricated buildings, that is, in which sections comprising two or more studs covered on the inside by sheets of plaster-board or laminated material, and outside by wood or other suitable material, are made up. Difficulty has been experienced in connecting these sections together when assembling in a building.

The object of this invention is to provide couplings which may be mounted in the sections and connected together when the sections are in place, and the invention consists in the construction as hereinafter described and particularly recited in the claims.

In the accompanying drawings:

Fig. 1 is a perspective view of two sections;

Fig. 2 is a sectional view on line 2—2 of Fig. 1;

Fig. 3 is a sectional view on line 3—3 of Fig. 2;

Fig. 4 is a sectional view on line 4—4 of Fig. 3;

Fig. 5 is a perspective view of one of the coupling-members, detached;

Fig. 6 is a perspective view of a second member, detached;

Fig. 7 is a sectional view illustrating a modified form of coupling;

Fig. 8 is a sectional view on line 8—8 of Fig. 7; and

Fig. 9 is a perspective view of a coupling-wedge.

For convenience of description, the sections will be referred to as walls or partitions, but it will be understood that sections forming the roof and flooring may be likewise coupled together.

Each section consists of two side uprights 10, 11, with one or more intermediate uprights 12. These are connected together in front and rear with facings 13 and 14 of desired material, and at intervals, the facing and uprights are formed on opposite sides with semicircular openings 15 and 16 which open into passages 17 and 18, and in one upright, here represented as 11, is a screw-threaded stem 19 carrying a nut 20 and this stem is formed with an outwardly-projecting post 21, and between the stem and the post is a cam 22. To prevent the post from turning, the base is formed on opposite sides with beveled wings 23, which are driven into the upright. Mounted in the other upright 10 is a loop 24 formed with a threaded shank 25 for a nut 26, and the hole 27, through which the stem of the loop passes, is formed with a clearance-passage 28, so that the loop may be drawn forward so as to be lifted over the outer end of the post 21, after which it is moved inward by a nut 29, and this turning of the nut 29 forces the loop over the cam 22 so as to draw the uprights 10 and 11 together. The post 21, when in position, is practically flush with the edge of the upright 11, and the loop 24 is moved inward so as not to project beyond the side of the upright 10. The nut 26, when properly adjusted, is welded or otherwise locked to the stem 19, which limits the outward movement of the loop. This construction permits the sections to be filled between the uprights with insulating material.

In erecting a building, two sections will be brought together and a hook or other implement passed through the openings 15, 16 and the loop drawn outward and lifted over the post 21, and the nut applied so as to draw the two sections firmly together. The openings may be covered in any desired manner.

Instead of using the post and loop, two loop-members 30 and 31 may be employed, the loops being similar to the loop 24 previously described, and these loops are one or both longitudinally movable, as described with reference to the loop 24, so that they may both be forced inward so as not to project beyond the adjacent faces of the abutting uprights. When the uprights are placed against each other, the loops are aligned and a wedge 32 of material softer than the material from which the loops are formed is driven inward through the loops, so as to draw the edges of two abutting sections together. By forming the wedge from material softer than the metal of the loops, there is less liability of loosening by vibration and hence less liability of separation of the sections.

It will thus be seen that provision is made for firmly uniting two prefabricated sections with freedom of placement before they are coupled together, and permitting the sections to be complete, and readily adapted not only for outer walls and partitions, but also for interlocking the sections for the roof and floors and for uniting the walls to the floor and the roof to the walls.

It will be understood by those skilled in the art that my invention may assume varied physical forms without departing from my inventive concept, and I, therefore, do not limit my invention to the specific embodiments herein chosen for illustration, but only as indicated in the appended claims.

I claim:

1. A coupling for sections of prefabricated buildings, comprising a threaded post and a beveled edge mounted in one section, a loop longitudinally movable in the other section and adapted to be set over the post when the sections are abutted, and means for coupling the loop to the post.

2. A coupling for sections of prefabricated buildings, comprising a threaded post, a screw-stem, and wings on opposite sides of the post, a loop longitudinally movable in the other section and adapted to be set over the post when the sections are abutted, and means for coupling the loop to the post.

3. A coupling for abutting sections of prefabricated buildings, each of which is formed with a side recess and with an intersecting notch, said coupling comprising a threaded post mounted in the recess in one section, a loop longitudinally movable in the recess of the other section and adapted to be set over the post when the sections are abutted, and means applied to the post for coupling the loop to the post and accessible through said notches.

DONALD L. WALLACE.